Sept. 21, 1943. J. A. McCORMICK, JR 2,329,922
APPARATUS FOR TREATING GLASS SHEETS AND THE LIKE
Filed Oct. 25, 1940
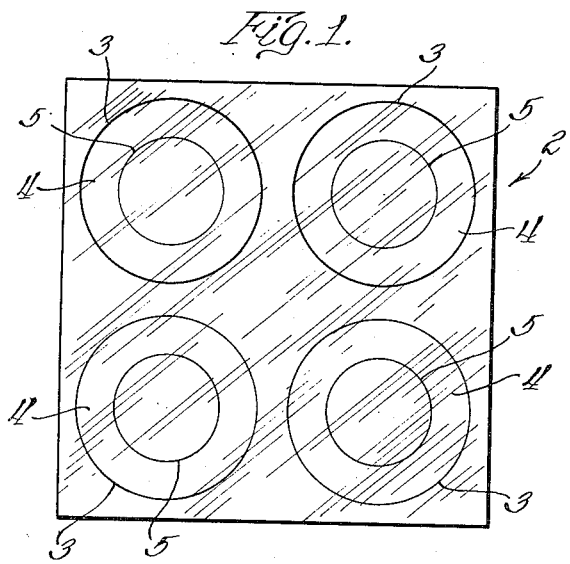
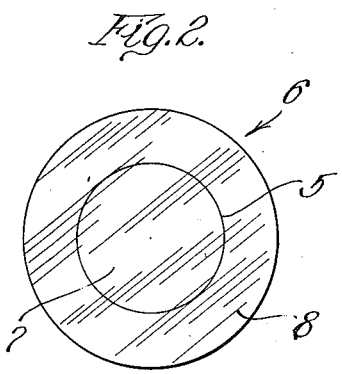
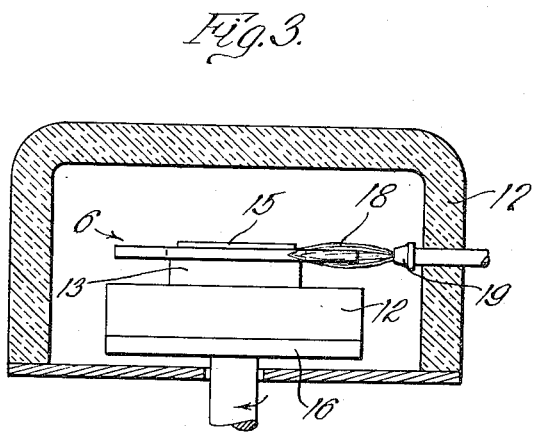
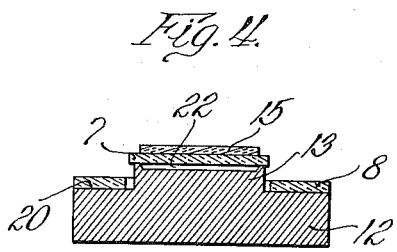
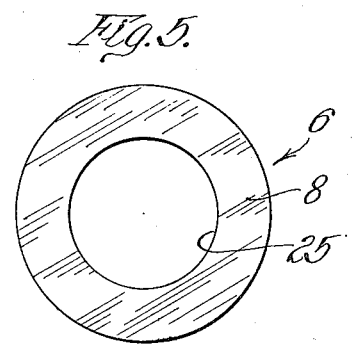
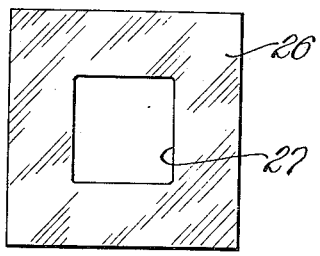
Inventor:
Joseph A. McCormick, Jr.

Patented Sept. 21, 1943

2,329,922

UNITED STATES PATENT OFFICE 2,329,922

APPARATUS FOR TREATING GLASS SHEETS AND THE LIKE

Joseph A. McCormick, Jr., Forest Park, Ill., assignor to Dearborn Glass Company, Chicago, Ill., a corporation of Illinois Application October 25, 1940, Serial No. 362,809

1 Claim. (Cl. 49—50)

My invention relates to an apparatus for forming an opening in a sheet of glass or other vitreous material. In its broader aspects the apparatus is adaptable for seperating a sheet of the character indicated into two integral parts.

It has long been the practice in the art to form openings in glass sheets by a grinding operation. This method is unsatisfactory for many reasons. For example, in grinding an opening the sheet must be turned over since it must be ground inwardly from both top and bottom surfaces to prevent chipping of the surfaces of the glass sheet adjacent the marginal edge defining the opening. Even if great care is exercised there nevertheless will be slight chipping of the glass surfaces. Grinding, at best, is a slow and expensive process. The marginal edge defining the opening will be roughened and if the glass sheet is to be used for decorative purposes in which this edge is exposed, a polishing operation is necessary. It has been my experience that this method is not economically feasible from a manufacturing standpoint. In addition this method lends itself only to the formation of circular openings.

It is an object of my invention to provide an apparatus for readily separating a glass sheet or the like into two integral parts, in which one portion of the glass sheet initially is substantially included within or surrounded by the other portion of the sheet.

A further object is to provide an apparatus for readily forming openings of any desired configuration in glass sheets and the like.

A further object is the provision of an apparatus adaptable for quantitative production and with which there is substantially no breakage of glass.

The method with which the present apparatus is particularly adapted to carry out is more fully disclosed in my co-pending application Serial No. 420,916, filed November 29, 1941, which application is a continuation-in-part of the instant application.

According to my method, I propose to score, in outline, the configuration of the opening desired upon one surface of the glass sheet by means of a suitable glass cutter. The glass sheet is then preferably flexed slightly by hand to produce a fracture along the line of the score between the portion inside of the scoring which is to be removed to form the opening, and the remainder of the glass sheet although production of the fracture in advance of heating is not absolutely essential in practicing my invention. I have found that by then heating the portion of the glass outside of the scoring to expand it while maintaining the portion of the glass inside the scoring relatively cool, the two portions may be readily separated to form in the sheet an opening with clear sharp edges.

A preferred feature of this invention is the provision of an apparatus adapted to support a glass sheet, after it has been scored in the manner noted, in a furnace or the like so that the portion of the sheet to be removed to form the opening is maintained at a lower temperature than the remainder of the sheet, or alternatively that that part of the sheet outside the line of the desired opening be heated to a higher temperature and thereby be expanded more than the part lying within the line of the desired opening.

So far as I am aware the principle of effecting separation of a glass sheet along a line scored upon the sheet by causing a relative change in dimensions between the portions defined by the scoring is broadly new. It will be understood that the application of the principle to a glass sheet is illustrative and not limiting, since the apparatus disclosed may be adaptable for use with materials other than glass.

Now in order to acquaint those skilled in the art with the manner of utilizing my invention, I shall disclose in conjunction with the accompanying drawing a specific embodiment of the same.

In the drawing:

Figure 1 is a plan view of a sheet of glass stock which has been scored to provide a number of small circular sheets upon each of which the outline of an opening to be formed therein have also been scored;

Figure 2 is a plan view of one of the smaller circular sheets of Figure 1;

Figure 3 is a side elevational view of one suitable means for supporting the circular sheet of Figure 2 in a furnace, the furnace being shown in section and somewhat diagrammatically;

Figure 4 is a sectional view of the supporting means of Figure 3 and showing in section, the inner and outer portions of the circular glass sheet separated from each other;

Figure 5 is a plan view of the circular sheet of glass with an opening formed therein; and Figure 6 is a plan view of a substantially square sheet having a substantially square opening.

Referring now to Figure 1, I have shown a sheet of flat glass stock 2 which has been scored, at 3, by means of a suitable glass cutter to outline a number of small circular glass sheets 4, which have been scored at 5 to outline the openings to be formed therein. The glass sheet 2 is preferably flexed slightly by hand to fracture the sheet along the score lines 3 and 5. The circular sheet 6 of Figure 2 is obtained by breaking away the glass sheet 2 outside of scoring 3. I have chosen to illustrate and describe the formation of a circular opening in a circular glass sheet, but it will be understood that the sheet and opening may be of any configuration desired. In the present embodiment the circular glass sheet 6 is to be used as a dial for a clock mounted in the dashboard of an automobile.

I have found that the core portion 7 of the glass sheet 6, i. e., the portion of the sheet inside of the scoring 5 may be separated from the outer ring portion 8, or the portion of the sheet outside the scoring, by causing a relative change in dimensions between the portions. For example, if the outer ring portion 8 is heated to expand it while the core portion 7 is maintained at a relatively lower temperature, the portions 7 and 8 will separate from each other along the scoring 5. I have found that if the circular sheet 6 is fractured along scoring 5 separation of portions 7 and 8 from each other is more readily effected. Alternatively, if desired, the core portion 7 may be caused to contract by lowering the temperature thereof while maintaining the temperature of the ring portion 8 substantially constant as by applying a cold metallic plate or body to the portion 7, or still further, the core portion 7 and ring portion 8 may be simultaneously contracted and expanded, respectively, in practicing my invention. By utilizing the above principle, of change of size by thermal contraction or expansion, I have formed openings in glass sheets which are exceedingly well defined and in which there is no roughing or discoloration of the marginal edges defining the openings or chipping of the surfaces of the glass sheets adjacent the openings. The simplicity of this method adapts itself to mass production at a low cost. By proper control of the temperature to which the glass is subjected breakage of the glass and warpage thereof is completely eliminated.

In Figures 3 and 4, I have shown an apparatus suitable for carrying out the practice of the invention. A metal block 12 is provided with an upwardly extending annular projection 13 upon which the core portion 7 of the circular glass sheet 6 is seated. The diameter of the annular projection 13 preferably is substantially the same as or slightly less than the diameter of the core portion 7. A piece of heat insulating material 15, such as asbestos, is disposed upon the upper surface of the core portion 7. The block member 12 is then preferably placed upon a rotatable platform member 16 in a furnace 17. The glass sheet should preferably be pre-heated before the outer ring portion 8 is brought into direct contact with the flame 18 issuing from the burner 19 since application of a direct flame might break the sheet. The furnace 17 may be designed to readily effect pre-heating of the glass sheet or other means may be employed, as desired. Rotation of the glass sheet in the flame 18 gradually increases the temperature of the outer ring portion 8 to a greater extent than that of core portion 7. If desired, a plurality of gas burners may be employed for heating the furnace and the ring portion 8.

The insulating material 15 shields the core portion 7 from the flame 18, and the annular projection 13, by conduction, serves to maintain the core portion at a lower temperature than the ring portion 8. As the ring portion 8 is heated it will expand and finally drop away from the core portion 7, and be received by the annular seat 20 of the block 12.

After the portions 7 and 8 have been separated from each other, the block 12 is removed from the furnace and the separated glass pieces removed therefrom, after which another circular glass sheet 6 may be positioned upon the projection 13 and inserted in the furnace to repeat the operation. The rotation of the sheet past the flame is not essential. It is merely a suitable way of getting the outer portion 8 heated up rapidly and fairly evenly.

I have found that it is preferable to form an annular recess 22 in the face of the projection 13 to provide a minimum area of contact between it and the core portion 7 of the glass sheet so that when a glass sheet at room temperature is placed upon the heated block 12, the core portion will not expand the sheet and break it before the temperature of the outer ring portion 8 can be raised to an appropriate degree and the proper temperature differential established between portions 7 and 8 of the sheet. Alternate apparatus for causing separation of the two portions may be readily devised in which the outer ring portion 8 supports the glass sheet and upon creating a difference in temperature of the portions 7 and 8, the core portion 7 will drop away from the supported sheet.

In Figure 5 the glass sheet 6 is shown having an opening 25 formed therein by the above described method and apparatus.

It will be apparent that apparatus may be readily devised to form openings of any desired configuration, and in Figure 6 I have shown a square sheet of glass 26 having a square opening 27 formed therein.

Heat may be extracted from the inner portion 7 at the same time that heat is added to the outer portion 8 if desired. The whole sheet may be heated and the center cooled or the whole sheet may be cooled and the outside portion 8 heated as may be desired. The apparatus which I have above described is preferred in the practice of the invention.

While I have described the apparatus of the present invention in connection with flat sheet glass, it will be readily obvious to those skilled in the art that my apparatus is readily adaptable for forming openings in curved sheets of glass.

I claim:

Apparatus for separating an inner part of a glass sheet or the like from a surrounding outer part as defined by a score comprising, a member having a projection for supporting the sheet, the perimeter of said member lying within the score on the sheet, a shelf for said member surrounding said projection and spaced from the end thereof by at least the thickness of the sheet, and heating means in juxtaposition of said member but out of contact with the sheet for heating the outer part of the sheet more than said inner part causing said outer part to separate by its own weight from said inner part, said shelf receiving said outer part upon separation thereof from said inner part.

JOSEPH A. McCORMICK, Jr.